US007975725B2

(12) United States Patent
Lauterbach

(10) Patent No.: US 7,975,725 B2
(45) Date of Patent: Jul. 12, 2011

(54) SPRING-LOADED PISTON ACCUMULATOR WITH LOCKING FUNCTION

(75) Inventor: Frank Lauterbach, Hochstadt (DE)

(73) Assignee: Rausch & Pausch GmbH, Selb (DE)

( * ) Notice: Subject to any disclaimer, the term of this patent is extended or adjusted under 35 U.S.C. 154(b) by 237 days.

(21) Appl. No.: 12/473,996

(22) Filed: May 28, 2009

(65) Prior Publication Data

US 2009/0293978 A1 Dec. 3, 2009

(30) Foreign Application Priority Data

May 30, 2008 (DE) ......................... 10 2008 026 121

(51) Int. Cl.
*F16L 55/04* (2006.01)

(52) U.S. Cl. ....... 138/31; 138/30; 303/119.2; 303/115.4

(58) Field of Classification Search .................... 138/30, 138/31; 303/115.4, 119.2

See application file for complete search history.

(56) References Cited

U.S. PATENT DOCUMENTS

| | | | | | |
|---|---|---|---|---|---|
| 4,201,522 | A | * | 5/1980 | Toyota et al. | 417/311 |
| 4,387,677 | A | * | 6/1983 | Guerrier | 123/179.7 |
| 4,877,187 | A | * | 10/1989 | Daly | 239/89 |
| 5,388,899 | A | * | 2/1995 | Volz et al. | 303/119.2 |
| 5,645,325 | A | * | 7/1997 | Mueller et al. | 303/119.2 |
| 5,669,675 | A | * | 9/1997 | Mueller et al. | 303/119.2 |
| 6,659,421 | B1 | * | 12/2003 | Goossens | 251/129.02 |
| 2005/0173979 | A1 | * | 8/2005 | Voss | 303/119.2 |

FOREIGN PATENT DOCUMENTS

| | | |
|---|---|---|
| DE | 102006014756 | 10/2007 |
| WO | 2007118500 | 10/2007 |

* cited by examiner

*Primary Examiner* — Patrick F Brinson

(74) *Attorney, Agent, or Firm* — Pepper Hamilton LLP

(57) ABSTRACT

A piston accumulator (10) comprises a pressure chamber (40) which is closed on one side by an axially shiftable piston (50) in order to change its volume depending on the axial position of the piston (50). A locking mechanism is provided for retaining the piston (50) in a second position different from a first position against a spring preload (190). The piston accumulator (10) further comprises an electromagnetic apparatus (80) having an armature (150) which is shifted upon axial shifting of the piston (50) from the first into the second position in its turn into an axial position in which a blocking element (175) of the locking mechanism is held by the armature (150) in a radial position so as to block a shift of the piston (50) back in the direction of its first position. For holding the blocking element (175) there is provided a separate interlocking member (170) which is fastened to the armature (150) and is made of a harder material than the armature (150).

39 Claims, 3 Drawing Sheets

SPRING-LOADED PISTON ACCUMULATOR WITH LOCKING FUNCTION

CROSS REFERENCE TO RELATED APPLICATIONS

This application claims priority to German Patent Application No. 10 2008 026 121.1, filed May 30, 2008 which is incorporated herein by reference in its entirety.

The present invention relates to a spring-loaded piston accumulator with a locking function.

Such piston accumulators comprise a pressure chamber which is closed on one side by a piston which is axially shiftable between a first and a second position in order to change the volume of the pressure chamber depending on the axial position of the piston. The piston is urged by spring preload into the first position which corresponds to a working condition of the piston accumulator in which the pressure chamber possesses a minimum volume. When the pressure chamber, during operation of the piston accumulator, is supplied for example with a hydraulic fluid (or a pneumatic fluid) via a system connection of the piston accumulator, the volume of the pressure chamber increases since the piston is shifted by the hydraulic pressure in the direction of the second position. A locking mechanism is provided for holding the piston in the second position against the spring preload for maintaining the pressure stored in the piston accumulator by means of the introduced fluid. A release of the locking mechanism finally releases the stored pressure. The locking mechanism can be blocked by means of an electromagnetic apparatus or in another manner for holding the piston in the second position.

In DE 10 2006 014 756 A1 there is disclosed a piston accumulator of the above-described kind which is used for storing hydraulic fluid of a hydraulic system of a gear device of a vehicle. Said piston accumulator replaces an additional pump controllable by electric motor, which normally supports a main gear pump driven by the internal combustion engine of the vehicle to permit a so-called start/stop function of the gear device by means of which the fuel consumption of the vehicle can be reduced.

The piston accumulator described in DE 10 2006 014 756 A1 comprises numerous complex component groups, however, whose production and assembly require high manufacturing effort.

It is one object of the present invention to propose a piston accumulator that can be produced cost-efficiently with simplified component groups and simpler manufacturing methods.

This object is achieved by a piston accumulator having the features of the independent claim. Advantageous embodiments and developments are stated in the dependent claims.

The inventive spring-loaded piston accumulator with a locking function comprises a pressure chamber which is closed on one side by an axially shiftable piston in order to change the volume of the pressure chamber depending on the axial position of the piston. A spring preload of the piston accumulator urges the piston into a first position. A locking mechanism is provided for retaining the piston in a second position different from the first position against the spring preload. The piston accumulator further comprises an electromagnetic apparatus having an armature which is shifted upon axial shifting of the piston from the first into the second position in its turn into an axial position in which at least one blocking element of the locking mechanism is held in a radial position by the armature so as to block a shift of the piston back in the direction of its first position. According to the invention there is provided for holding the at least one blocking element at least one separate interlocking member which is fastened to the armature and which is made of a harder material than the armature.

This makes it possible to provide in a simple manner an interlocking member with a hardness necessary for its function without the need to completely or at least partly harden the armature, which is preferably made of a magnetically soft material. Complete hardening would result in an impairment of the magnetic properties of the armature, while at least partial hardening in the area of the interlocking member by case hardening would be technically elaborate and thus expensive. The inventive armature, while having a simple and cost-efficient structure, fulfills both features, namely, good magnetizability of the armature and an interlocking member with a hardness sufficient for actuating blocking elements which is firmly connected to the armature.

In a preferred embodiment, the interlocking member is pressed onto the armature. Other manners of fastening the interlocking member to the armature are likewise possible.

Preferably, the interlocking member is configured as a ball ramp and the blocking element as a ball. This makes it possible to realize a very simply constructed and reliably functioning locking mechanism which requires no further components and can thus be produced and assembled cost-efficiently. Other forms of interlocking members and/or blocking elements can be used, whereby the number of interlocking members and/or blocking elements used can vary. For example, one interlocking member can radially shift a plurality of blocking elements, or a plurality of blocking elements can be actuated by a plurality of interlocking members.

On a side face, facing the armature, of a pole member of the electromagnetic apparatus of the piston accumulator there can be disposed a preferably annular area connected to the pole member in material-locking fashion and made of the same material as the pole member. Said area replaces a conventionally used residual plate, which prevents the armature from sticking in a sticking position on the pole member even when the power supply no longer exists to the coil of the electromagnetic apparatus which causes a holding of the armature in the energized state. The desired effect of the area arises due to the geometry of the area. Said area thus makes it possible to save a component of the piston accumulator, which simplifies the assembly of the piston accumulator. Such an area can alternatively also be disposed on a side face of the armature facing the pole member. Said area is then accordingly made of the same material as the armature.

Preferably, the area replacing the residual plate is produced by extrusion or sintering on the pole member (or the armature), thereby allowing a cost-efficient production. Other suitable production techniques can likewise be used.

The area possesses approximately a thickness of 0.05 to 0.1 mm, preferably a thickness of about 0.08 mm, and occupies approximately a proportion between 5% and 20%, preferably between 10% and 15%, of the particular side face. As mentioned above, the area is normally of annular configuration, but other forms, including disconnected ones, are possible.

In a preferred embodiment, the end of the armature facing away from the piston and facing the pole member has a reduced cross section. Said reduced cross section is advantageously configured as a jump in diameter from a large to a smaller external diameter, but can also be executed in a different manner. This makes it possible to increase the magnetic flux density in the sticking position of the armature on the pole member and to strengthen the sticking effect without having to apply more energy.

The piston accumulator can comprise a cup which is inserted into a tube of the piston accumulator in which the piston is axially shiftable. The cup receives at least part of the electromagnetic apparatus. Preferably, the cup is configured and adapted such that a wall of the cup forms part of the magnetic circuit of the electromagnetic apparatus. The magnetic circuit can be completed for example by the pole member, the armature and parts of an armature tube in which the armature is guided shiftably and which can likewise be disposed in the cup. Separate components that are normally provided specially for producing a corresponding magnetic circuit become dispensable, thereby simplifying the structure and assembly of the piston accumulator, with the result of reduced costs.

Preferably, the cup is of multifunctional configuration, providing for example at the same time a stop for the piston when the latter is shifted in the direction of its second position. Furthermore, the cup can serve as a guide for a helical spring producing the spring preload by the cup extending suitably into the tube of the piston accumulator. Both features decrease the number of required components and keep the structure of the piston accumulator simple.

Finally, the cup is preferably disposed in the tube immediately adjacent to the tube, whereby the armature tube carrying the armature is further preferably disposed immediately in the cup. In this manner the armature is optimally centered in the tube and aligned with the piston to guarantee proper functioning of the locking mechanism.

The cup is preferably configured as a deep drawn part, so that it can be produced simply and cost-efficiently.

Also, a component group of the electromagnetic apparatus that comprises a spool with a wire-wound coil, the pole member connected to the spool, and a base connected to the pole member for a plug for power supply to the coil can be disposed in the cup, preferably by being simply pressed in. This ensures not only cost-efficient assembly but also a vibration-free arrangement of the component group.

The components of the component group mentioned hereinabove are configured such that they are already joinable before the coil is wound on the spool. For example, the base can be injection-molded onto the pole member and the pole member can be connected to the spool by a clip connection or the like. Alternative connecting techniques can be used. In this manner it is possible to connect both wire ends of the coil immediately to contact terminals of the base. A conventional contacting of the wire ends with terminals of the spool, which are for their part subsequently connected to the contact terminals of the base in a further production step, can be omitted due to the assembly of the components of the component group which is effected before the winding of the coil.

In a preferred embodiment, the piston is of multi-part configuration and comprises at least a first piston member and a second piston member, at least one of the two piston members being hardened and disposed to cooperate with the locking mechanism so as to lock into place. In this manner a cost-efficient production of the piston is supported, because only those parts of the piston that are subjected to strong mechanical stresses are of hardened configuration, while other piston parts that are less stressed mechanically can be made of simple, unhardened and thus more cost-efficient materials.

Preferably, the piston which is axially shiftable in the tube of the piston accumulator is sealed from the tube by at least one ring seal inserted in a circumferential groove of the piston, the circumferential groove being formed only by axially joining the first piston member and the second piston member. This makes it possible for seals with one-part, cost-efficient seal elements, e.g. O-ring seals and/or slide ring seals, to be used and the seal elements to be mounted without strain on one of the two piston members before the latter is joined with the other piston member to form the piston, as well as the circumferential groove of the piston. A simply assembly of the piston and in particular of the circumferential groove can be effected for example by slipping the two piston members into each other.

The piston members are preferably configured as deep drawn parts. A non-cutting manufacturing of the piston members enabled in this manner simplifies the production of the piston and reduces the accruing costs. The hardening of the at least one piston member can be effected after the deep drawing. Further, one of the piston members, for example the second piston member, can serve to define a stop position of the piston beyond the second position by cooperating with a stop, e.g. the above-mentioned stop of the cup, upon shifting of the piston beyond the second position. To perform this function, the corresponding piston member need not necessarily be hardened, which offers a cost advantage, as mentioned.

The multi-part piston can further comprise a disk which is disposed firmly and sealingly in one of the two piston members. Said disk serves not only to seal the tube from the pressure chamber but also as an actuating member for actuating the locking mechanism, for example by cooperating with the armature upon shifting of the piston in the direction of its second position, and causing a shift of said armature. In particular, the disk can be disposed in the piston member such that it is alignable axially in relation to the locking mechanism or the armature during assembly of the piston accumulator. This makes it possible to ensure with simple technical means that the armature is not shifted too far upon shifting of the piston in the direction of the second position, thereby damaging other component groups, for example components of the electromagnetic apparatus. Complicated and technically elaborate tolerance-compensating mechanisms for the armature are dispensable.

As a further one-sided boundary of the pressure chamber and as a system connection for supplying pressure-generating fluid there can be provided a connecting flange which is inserted in the tube of the piston accumulator. The connecting flange can be fastened to the tube simply and cost-efficiently by rolling the tube into a groove of the connecting flange. Other connecting techniques can likewise be used, however, whereby the form of the system connection is variable. It is preferable to produce the connecting flange from a plastic material. This simplifies e.g. a flow-optimized design of fluid guiding channels. The tube of the piston accumulator can also be made of plastic.

The present invention will hereinafter be explained by way of example with reference to the attached drawings. Therein is shown:

Figure 1:
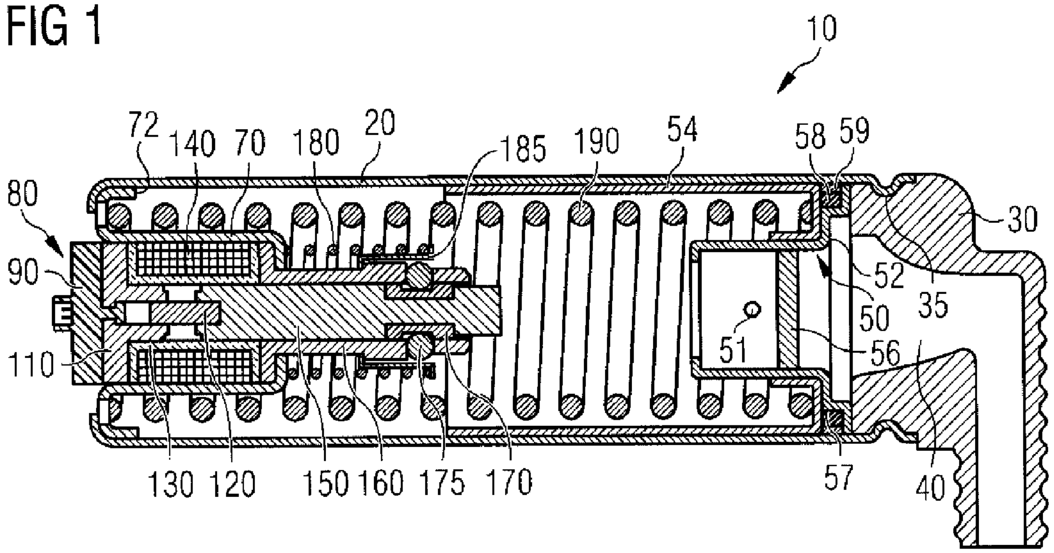
FIG. 1 shows a sectional representation of a preferred embodiment of an inventive piston accumulator.

With reference to FIG. 1, a piston accumulator 10 comprises a pressure chamber 40 which is closed on one side by a piston 50. The piston 50, which will hereinafter be described more precisely with reference to FIG. 4, is axially shiftable in a tube 20 of the piston accumulator 10 between a first position (as shown in FIG. 1) and a second position in order to change the volume of the pressure chamber 40 depending on the axial position of the piston 50. Via hydraulic fluid (or pneumatic fluid) suppliable a system connection [sic], such as a connecting flange 30 shown in FIG. 1, the piston 50 is shifted in the direction of the second position against a spring preload by means of fluid pressure. The connecting flange 30 likewise limits the pressure chamber 40 on one side, whereby portions of the tube 20 also take up fluid pressure upon increased pressure-chamber volume. The spring preload is produced here by a helical spring 190, but can also be supplied in a different manner, e.g. pneumatically. The helical spring 190 is partially guided through a cup 70 which in its turn is disposed in the tube 20 on the side, opposing the connecting flange 30, of the tube 20 of the piston accumulator 10 and partially receives an electromagnetic apparatus 80 of the piston accumulator 10, which will in its turn be described more precisely with reference to FIGS. 2 and 3A to 3C.

The basic principle of operation of the piston accumulator 10 will be briefly set forth hereinafter. The electromagnetic apparatus 80 comprises an armature 150 which is axially shiftable in an armature tube 160 which is disposed in the cup 70. Upon axial shifting of the piston 50 from the first position into the second position due to fluid pressure, the armature 150 is in its turn axially shifted from its first position shown in FIG. 1 when a disk 56 of the piston 50 hits the armature 150 and carries it along. Further, upon axial shifting of the piston 50 in the direction of the second position, before the disk 56 hits the armature 150, cover plates 185 are shifted in the direction of shift of the piston 50 against a preload produced by a spring 180 when portions, facing the armature 150, of a piston member 52 of the piston 50 cooperate with the cover plates 185. Due to the shifted cover plates 180 [sic], blocking elements 175 can now be shifted radially through gaps in the armature tube 160 by means of an interlocking member 170 which is fastened to the armature 150, and be held in a position that prevents the piston 50 from shifting back in the direction of the first position. This is obtained by the armature 150, which has been shifted by the disk 56 of the piston 50 axially in the direction of a pole member 110 of the electromagnetic apparatus 80, being held by electromagnetic force on the pole member 110. This is done using a wire-wound coil 140 which is wound on a spool 130 and supplied with power via a plug connection 90. That is, a shift of the armature 150 back in the direction of its first axial position (shown in FIG. 1) is prevented. However, this also prevents the piston 50 from shifting back in the direction of its first position, because the piston member 52 could be shifted over the—not yet radially shifted—blocking elements 175 upon its shift in the direction of the second position, but is now prevented from shifting back by the same, in their position radially changed and held by the interlocking member 170 (firmly connected to the armature 150). When the coil 140 is no longer supplied with power, the armature 150 is released by the electromagnetic apparatus 80 and the armature 150 shifts into its starting position shown in FIG. 1 due to a spring preload 155 (not shown in FIG. 1, see FIG. 2). The interlocking member 170 firmly connected to the armature 150 is thereby also shifted axially in the same manner, so that the blocking elements 175 can fall back radially into their starting positions and release the piston member 52 of the piston 50. The piston 50 thereupon releases the pressure stored by means of the helical spring 190, via the fluid stored in the pressure chamber 40.

Figure 2:
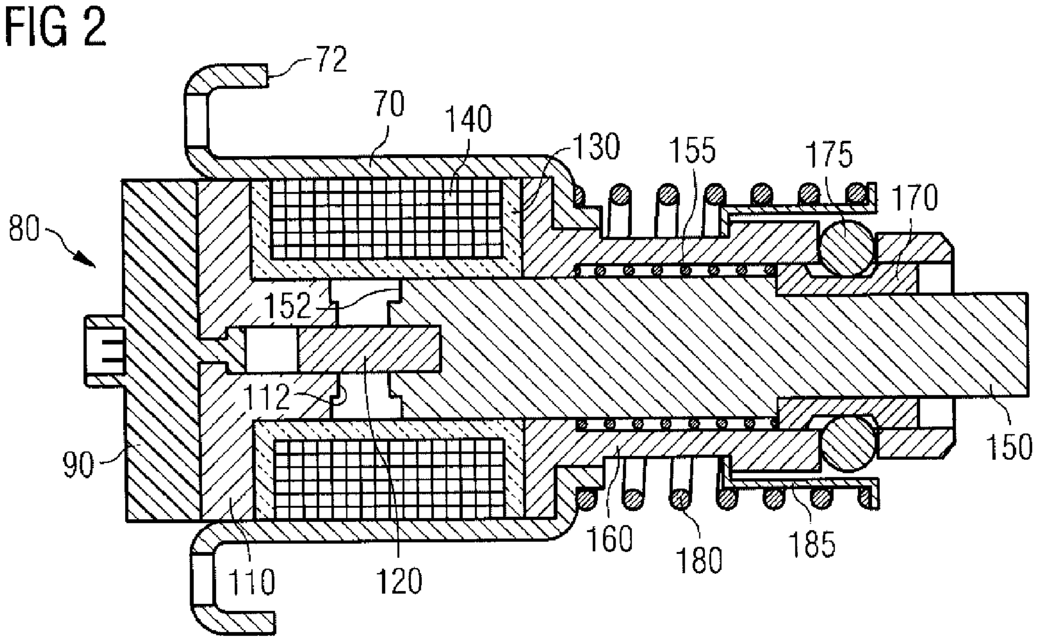
FIG. 2 shows an enlarged representation of individual cooperating component groups of the piston accumulator from FIG. 1 likewise as a sectional representation.

FIG. 2 shows an enlarged view of the locking mechanism comprising the interlocking member 170 and the blocking elements 175, as well as surrounding and adjoining components of the electromagnetic apparatus 80. The number of interlocking members 170 and blocking elements 175 can be varied, whereby only one interlocking member 170 (as in FIG. 2) and/or one blocking element 175 can also be used. The interlocking member 170 is fastened to the armature 150 as a separate component and made of a harder material than the armature 150, which is in its turn made of a magnetically soft material. In the embodiment shown in FIG. 2, the interlocking member 170 is pressed onto the armature 150 and configured as a ball ramp which is adapted to radially shift the blocking elements 175 in the form of balls.

Figure 3A:
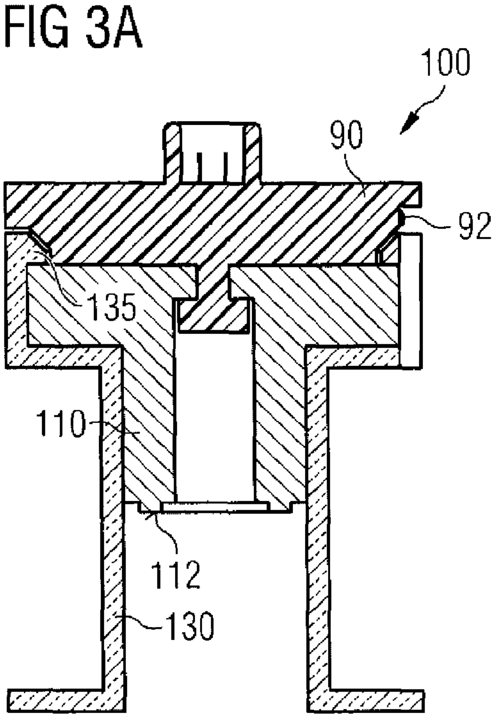
FIGS. 3A and 3B are sectional representations of a component group of an electromagnetic apparatus of the piston accumulator from FIG. 1, without a wire-wound coil (FIG. 3A) and with a wire-wound coil with wire ends contacted directly to connecting contacts of a plug base (FIG. 3B)
Figure 3B:
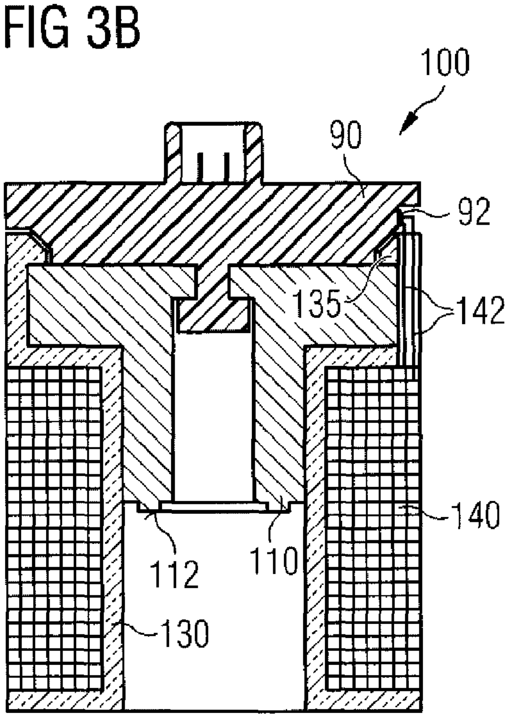
Figure 4:
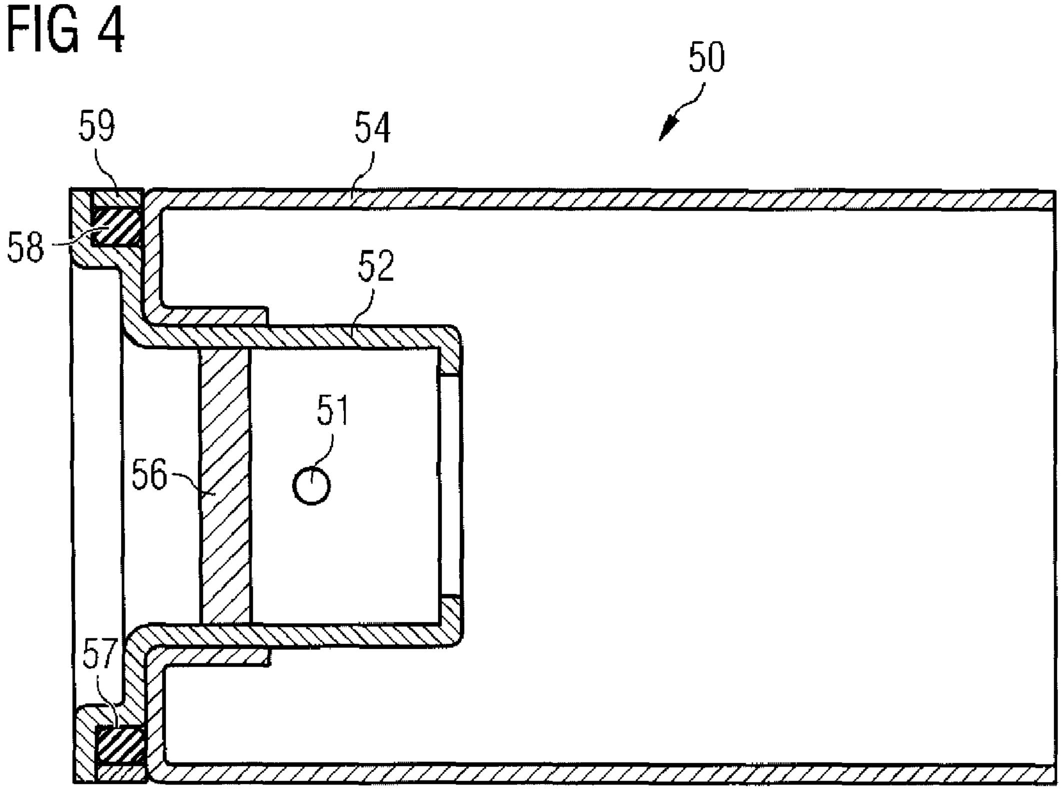
FIG. 4 shows an enlarged sectional representation of a multi-part piston of the piston accumulator from FIG. 1.

On the side face of the pole member 110 facing the armature 150 there is disposed a preferably annular area 112 connected to the pole member 110 in material-locking fashion and made of the same material as the pole member 110 (see also FIGS. 3A, 3B). Said area 112, which analogously can be disposed additionally or alternatively on the side face of the armature 150 facing the pole member 110 and is then accordingly made of the same material as the armature 150, performs the function of a customarily used residual plate, which is to prevent the armature 150 from continuing to stick to the pole member 110 in the sticking position even when the power supply to the coil 140 is no longer maintained. The desired effect of the area 112, i.e. to prevent the armature 150 from "sticking" to the pole member 110, arises due to the geometry of the area 112. In the shown embodiment, the area 112 has been formed by means of sintering. Other production techniques, such as extrusion, can likewise be used. The area possesses a thickness of 0.05 to 1 mm, preferably a thickness of about 0.08 mm, and occupies a proportion between about 5% to 20%, preferably between 10% and 15%, of the corresponding side face of the pole member or armature.

To increase the magnetic flux density of the electromagnetic field produced by the coil 140 in the sticking position of the armature 150 on the pole member 110, the side of the armature 150 facing away from the piston 50 has a reduced cross section 152 which, in the embodiment shown in FIG. 2, is based on a jump in diameter from a large to a smaller external diameter.

Figure 3C:
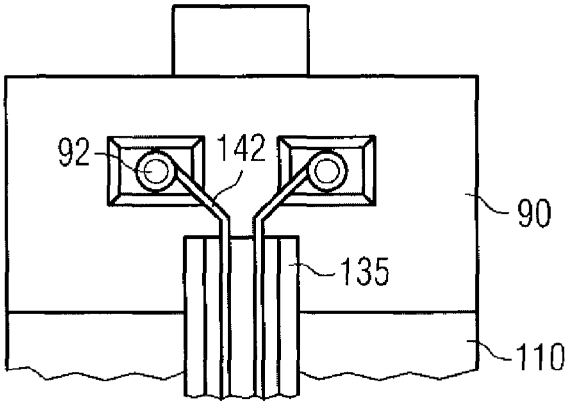
FIG. 3C shows a detail of the component group from FIG. 3B in a plan view, showing the contacting of the wire ends of the coil with the corresponding connecting contacts.

The cup 70 is produced from a magnetically conductive material as a deep drawn part. Other production techniques are possible. A wall of the cup 70 forms part of the magnetic circuit of the electromagnetic apparatus 80. The magnetic circuit extends from the wall of the cup 70 through the pole member 110, the armature 150, the part of the armature tube 160 adjoining the spool 130, back to the cup wall. As to be seen in FIG. 1, the cup 70 further serves as a stop 72 for the piston 50, more precisely for a piston member 54, when the piston 50 is shifted beyond its second position. Since the cup 70 is immediately adjacent to the tube 20 of the piston accumulator 10, and the armature tube 160 is in its turn disposed directly in the cup 70, and no further components that might promote any tolerances are used upon assembly of the piston accumulator 10, the armature 150 is optimally centered and aligned in relation to the piston 50, thereby ensuring proper functioning of the locking mechanism. A component group 100 of the electromagnetic apparatus 80 described more precisely hereinafter with reference to FIGS. 3A, 3B and 3C is pressed into the cup 70 without play, thereby being mounted free from vibration.

As shown in FIG. 3A, the component group 100 comprises the spool 130 for carrying the wire-wound coil 140 (FIG. 3B), the pole member 110 connected to the spool 130, and the base 90 connected to the pole member for the plug for power supply to the coil 140. The components of the component group 100 are already joined before winding of the wire-wound coil 140, as to be seen in FIG. 3A. In the embodiment from FIG. 3A the pole member 110 is clipped to the spool 130 by means of a clip connection 135 of the spool 130, while the base 90 is injection-molded onto the pole member 110. However, it is also possible to use other connecting techniques for connecting the corresponding components to form the component group 100.

After winding of the wire-wound coil 140, the ends of the coil 142 can be connected directly to contact terminals 92 of the plug base 90 due to the structure of the component group 100. For this purpose, in the described embodiment, as shown in FIG. 3B, the particular wire ends 142 are guided through a channel in an arm of the clip connection 135 of the spool 130 from the coil 140 past the pole member 110 directly to the contact terminals 92 and suitably connected there to the contact terminals 92, as sketched in FIG. 3C in a plan view. The ends 142 of the coil wire can also be guided to the contact terminals 92 in a different manner and on a different route. Preferably, the fully contacted terminals 92 and the fed wire ends 142 of the coil 140 are covered with an attached cap or the like (not shown) and thereby protected.

With reference to FIGS. 1 and 4, the multi-part piston 50 will now be described more precisely, which in the shown embodiment is sealed from the tube 20 of the piston accumulator 10 by seals 58, 59 which are inserted in a circumferential groove 57 of the piston 50. Alternative forms of the seal are possible. The circumferential groove 57 is only formed by axially joining the first piston member 52 with the second piston member 54. In the embodiment of the piston 50 shown in FIG. 4, the first and second piston members 52, 54 are slipped into each other to thereby form the circumferential groove 57 of the piston 50. In the circumferential groove 57 there are disposed an O-ring seal 58 and a sliding ring 59. Due to the structure of the piston 50 the two seals 58, 59 can already be fitted onto the first piston member 52 before the second piston member 54 is slipped onto the first piston member 52, forming the groove 57 together with the piston member 52, i.e. the seals 58, 59 can be of one-part configuration and be mounted simply and without strain.

The first piston member 52 is hardened and disposed to cooperate with the locking mechanism so as to lock into place, as described with reference to FIG. 1. The second piston member 54 need not necessarily be hardened, because it only serves to define an end position of the piston 50 upon hitting the stop 72 of the cup 70 upon shifting of the piston 50 beyond the second position (see FIG. 1). Both piston members are configured as deep drawn parts, although other manufacturing methods are also possible. Before hardening, a hole 51 has been formed, e.g. punched, in the first piston member 52 to enable the escape of air upon shifting of the piston 50 through the tube 20. There can also be provided a plurality of holes 51. They can also be configured as throttles to damp the approach of the piston 50 to its second position.

The disk 56 disposed firmly and sealingly in the first piston member 52 serves, as described with reference to FIG. 1, to shift the armature 150 upon shifting of the piston 50 in the direction of the second position by striking and carrying it along in the same direction, and thereby to indirectly actuate the locking mechanism. Upon the assembly of the piston accumulator 10 the disk 56 in the first piston member 52 can be axially aligned in relation to a position of the locking mechanism, in particular to the position of the armature 150, to prevent damage to the electromagnetic apparatus 80 in case of an excessive axial shift of the armature 150 in the direction of the pole member 110. This makes it possible to dispense with an elaborate length-compensating mechanism (not shown) in the armature 150.

As to be seen in FIG. 1, the connecting flange 30 is fastened to the tube 20 by simply rolling the tube 20 into a groove 35 in the connecting flange 30. Other connecting techniques can likewise be used. In the connecting flange 30 there can additionally be disposed in suitable fashion damping elements and/or throttle valves (not shown) and the like in order to regulate the piston motion upon axial shifting and the (back) flow of fluid.

The connecting flange 30 is made of plastic material in the shown embodiment, but other suitable materials can also be used. The tube 20 can also be made of a suitable plastic material.

I claim:

1. A spring-loaded piston accumulator with a locking function, comprising:

a pressure chamber which is closed on one side by an axially shiftable piston in order to change the volume of the pressure chamber depending on the axial position of the piston;

a spring preload which urges the piston into a first position;

a locking mechanism for retaining the piston in a second position different from the first position against the spring preload;

an electromagnetic apparatus having an armature which is shifted upon axial shifting of the piston from the first into the second position in its turn into an axial position in which at least one blocking element of the locking mechanism is held by the armature in a radial position so as to block a shift of the piston back in the direction of its first position; and at least one separate interlocking member, which is fastened to the armature and made of a harder material than the armature, for holding the at least one blocking element in the radial position.

2. The piston accumulator according to claim 1, wherein the inter-locking member is pressed onto the armature.

3. The piston accumulator according to claim 1, wherein the interlocking member is configured as a ball ramp, and the blocking element as a ball.

4. The piston accumulator according to claim 1, further comprising on a side face, facing the armature, of a pole member of the electromagnetic apparatus there is disposed an area connected in material-locking fashion to the pole member, and/or on a side face of the armature facing the pole member there is disposed an area connected in material-locking fashion to the armature.

5. The piston accumulator according to claim 4, wherein the area has been formed by means of sintering or extrusion.

6. The piston accumulator according to claim 4, wherein the area has a thickness of 0.05 to 0.1 mm.

7. The piston accumulator according to claim 4, wherein the area occupies between 5% and 20% of the particular side face.

8. The piston accumulator according to claim 1, wherein the end of the armature facing away from the piston has a reduced cross section.

9. The piston accumulator according to claim 8, wherein the reduced cross section is executed as a jump in diameter from a large to a smaller external diameter.

10. The piston accumulator according to claim 1, further comprising a cup which is inserted in a tube in which the piston is axially shiftable, and which receives at least part of the electromagnetic apparatus, with a wall of the cup being disposed to form part of the magnetic circuit of the electromagnetic apparatus.

11. The piston accumulator according to claim 10, wherein the cup is so mounted in the tube that the cup forms a stop for the piston.

12. The piston accumulator according to claim 10, wherein the cup extends within a helical spring producing the spring preload such that the cup serves as a guide for the helical spring.

13. The piston accumulator according to claim 10, wherein the cup is configured as a deep drawn part.

14. The piston accumulator according to claim 10, wherein the cup is immediately adjacent to the tube.

15. The piston accumulator according to claim 10, wherein the electromagnetic apparatus is pressed at least partly into the cup.

16. The piston accumulator according to claim 1, wherein the piston which is axially shiftable in a tube is of multi-part configuration and comprises at least a first piston member and a second piston member, whereby at least one of the two piston members is hardened and is disposed to cooperate with the locking mechanism so as to lock into place.

17. The piston accumulator according to claim 10, wherein the piston is of multi-part configuration and comprises at least a first piston member and a second piston member, whereby at least one of the two piston members is hardened and is disposed to cooperate with the locking mechanism so as to lock into place.

18. The piston accumulator according to claim 16, wherein the piston is sealed from the tube by at least one ring seal inserted in a circumferential groove of the piston, the circumferential groove being only formed by axial joining of the first piston member and the second piston member.

19. The piston accumulator according to claim 16, wherein the first piston member and the second piston member are adapted to be slipped into each other to form the circumferential groove.

20. The piston accumulator according to claim 16, wherein the first piston member and/or the second piston member are deep drawn parts.

21. The piston accumulator according to claim 16, wherein one of the two piston members is disposed to cooperate with a stop upon a shift of the piston beyond the second position.

22. The piston accumulator according to claim 16, wherein the multi-part piston comprises a disk which is disposed firmly and sealingly in one piston member and serves as an actuating member for actuating the locking mechanism.

23. The piston accumulator according to claim 22, wherein the disk is disposed in the piston member such that it is axially alignable in relation to a position of the locking mechanism during the assembly of the piston accumulator.

24. The piston accumulator according to claim 1, wherein as a one-sided boundary of the pressure chamber a connecting flange is inserted in a tube in which the piston is axially shiftable, and is fastened to the tube by rolling of the tube into a groove in the connecting flange.

25. The piston accumulator according to claim 10, wherein as a one-sided boundary of the pressure chamber a connecting flange is inserted in the tube and is fastened to the tube by rolling of the tube into a groove in the connecting flange.

26. The piston accumulator according to claim 24, wherein the connecting flange is formed of a plastic material.

27. The piston accumulator according to claim 24, wherein the electromagnetic apparatus comprises a component group having a spool, a wire-wound coil on the spool, a pole member connected to the spool, and a base connected to the pole member for a plug for power supply to the coil, with the two ends of the wire-wound coil being connected immediately to contact terminals of the base.

28. The piston accumulator according to claim 27, wherein the base is injection-molded onto the pole member.

29. The piston accumulator according to claim 27, wherein the pole member is connected to the spool by means of a clip connection.

30. The piston accumulator according to claim 17, wherein the piston is sealed from the tube by at least one ring seal inserted in a circumferential groove of the piston, the circumferential groove being only formed by axial joining of the first piston member and the second piston member.

31. The piston accumulator according to claim 17, wherein the first piston member and the second piston member are adapted to be slipped into each other to form the circumferential groove.

32. The piston accumulator according to claim 17, wherein the first piston member and/or the second piston member are deep drawn parts.

33. The piston accumulator according to claim 17, wherein one of the two piston members is disposed to cooperate with a stop upon a shift of the piston beyond the second position.

34. The piston accumulator according to claim 17, wherein the multi-part piston comprises a disk which is disposed firmly and sealingly in one piston member and serves as an actuating member for actuating the locking mechanism.

35. The piston accumulator according to claim 34, wherein the disk is disposed in the piston member such that it is axially alignable in relation to a position of the locking mechanism during the assembly of the piston accumulator.

36. The piston accumulator according to claim 25, wherein the connecting flange is formed of a plastic material.

37. The piston accumulator according to claim 25, wherein the electromagnetic apparatus comprises a component group having a spool, a wire-wound coil on the spool, a pole member connected to the spool, and a base connected to the pole member for a plug for power supply to the coil, with the two ends of the wire-wound coil being connected immediately to contact terminals of the base.

38. The piston accumulator according to claim 37, wherein the base is injection-molded onto the pole member.

39. The piston accumulator according to claim 37, wherein the pole member is connected to the spool by means of a clip connection.

* * * * *